US012185130B2

(12) United States Patent
Tajika

(10) Patent No.: US 12,185,130 B2
(45) Date of Patent: Dec. 31, 2024

(54) SYSTEM, COMMUNICATION APPARATUS, COMPUTER-READABLE STORAGE MEDIUM AND CONTROL METHOD

(71) Applicant: SoftBank Corp., Tokyo (JP)

(72) Inventor: Akihiko Tajika, Saitama (JP)

(73) Assignee: SoftBank Corp., Tokyo (JP)

( * ) Notice: Subject to any disclaimer, the term of this patent is extended or adjusted under 35 U.S.C. 154(b) by 371 days.

(21) Appl. No.: 17/709,368

(22) Filed: Mar. 30, 2022

(65) Prior Publication Data

US 2022/0224402 A1 Jul. 14, 2022

Related U.S. Application Data

(63) Continuation of application No. PCT/JP2020/031039, filed on Aug. 17, 2020.

(30) Foreign Application Priority Data

Oct. 3, 2019 (JP) ................................. 2019-183223

(51) Int. Cl.
*H04W 24/02* (2009.01)
*G01S 3/16* (2006.01)
(Continued)

(52) U.S. Cl.
CPC ............... *H04W 24/02* (2013.01); *G01S 3/16* (2013.01); *H04W 16/28* (2013.01); *H04W 24/08* (2013.01)

(58) Field of Classification Search
None
See application file for complete search history.

(56) References Cited

U.S. PATENT DOCUMENTS 11,239,902 B2   2/2022   Matsuura
2005/0275597 A1  12/2005   Tian
(Continued)

FOREIGN PATENT DOCUMENTS

| CN | 105515689 B | 8/2018 | |
| EP | 2749892 A2 * | 7/2014 | ............. H04B 17/12 |

(Continued)

OTHER PUBLICATIONS

International Preliminary Report on Patentability for International Application No. PCT/JP2020/031039, issued by the International Bureau of WIPO on Apr. 5, 2022.

(Continued)

*Primary Examiner* — Bernarr E Gregory

(57) ABSTRACT

Provided is a system, including: a first communication apparatus including a first directional antenna; and a second communication apparatus, loaded on a mobile object, including a second directional antenna, wherein the first communication apparatus includes: a first adjustment performing unit configured to perform a calibration of the first directional antenna; and a first notification information transmitting unit configured to transmit a first notification information to the second communication apparatus according to a completion of a calibration of the first directional antenna by the first adjustment performing unit; and wherein the second communication apparatus includes a second adjustment performing unit configured to perform a calibration of the second directional antenna according to a receipt of the first notification information.

20 Claims, 12 Drawing Sheets

(51) Int. Cl.
    *H04W 16/28* (2009.01)
    *H04W 24/08* (2009.01)

(56) References Cited

U.S. PATENT DOCUMENTS

| | | | | |
|---|---|---|---|---|
| 2016/0112116 A1* | 4/2016 | Jalali | ............... | H04W 16/28 |
| | | | | 370/252 |
| 2016/0337027 A1* | 11/2016 | Jalali | ............ | H04B 7/18504 |
| 2018/0115065 A1 | 4/2018 | Valdes Garcia | | |
| 2018/0132252 A1* | 5/2018 | Islam | ............... | H04W 72/51 |
| 2019/0386752 A1* | 12/2019 | Zhou | ............... | H04B 17/12 |
| 2020/0029345 A1* | 1/2020 | Malik | ............... | H04W 24/08 |

FOREIGN PATENT DOCUMENTS

| | | | | |
|---|---|---|---|---|
| EP | 3386125 A1 * | 10/2018 | ............ | H04B 17/12 |
| JP | 2002250762 A | 9/2002 | | |
| JP | 2003087189 A | 3/2003 | | |
| JP | 2018186346 A | 11/2018 | | |
| JP | 2019135823 A | 8/2019 | | |

OTHER PUBLICATIONS (ISA/237) Written Opinion of the International Search Authority for International Patent Application No. PCT/JP2020/031039, issued/mailed by the Japan Patent Office on Nov. 17, 2020.
Extended European Search Report for counterpart European Application No. 20871397.4, issued by the European Patent Office on Oct. 6, 2023.

\* cited by examiner

SYSTEM, COMMUNICATION APPARATUS, COMPUTER-READABLE STORAGE MEDIUM AND CONTROL METHOD

The contents of the following Japanese patent application(s) are incorporated herein by reference:
NO. 2019-183223 filed in Japan (JP) on Oct. 3, 2019
NO. PCT/JP2020/031039 filed in the World Intellectual Property Organization (WO) on Aug. 17, 2020

BACKGROUND

1. Technical Field

The present invention relates to a system, a communication apparatus, a computer-readable storage medium and a control method.

2. Related Art

A flight vehicle configured to establish a service link with a communication terminal on the ground, establish a feeder link using a directional antenna with a gateway on the ground, and provide a wireless communication service to a communication terminal is known (for example, refer to Patent Document 1).

PRIOR ART DOCUMENT

Patent Document

[Patent Document 1] Japanese Patent Application Publication No. 2019-135823

3. Technical Problem

When two communication apparatuses communicate with each other using a directional antenna, at least one of which is loaded on a mobile object, it is desirable that a technology can be provided to be able to support to realize a high communication quality as unaffected as possible by the movement of the mobile object.

DESCRIPTION OF EXEMPLARY EMBODIMENTS

Hereinafter, (some) embodiment(s) of the present invention will be described. The embodiment(s) do(es) not limit the invention according to the claims. And all the combinations of the features described in the embodiment(s) are not necessarily essential to means provided by aspects of the invention.

Figure 1:
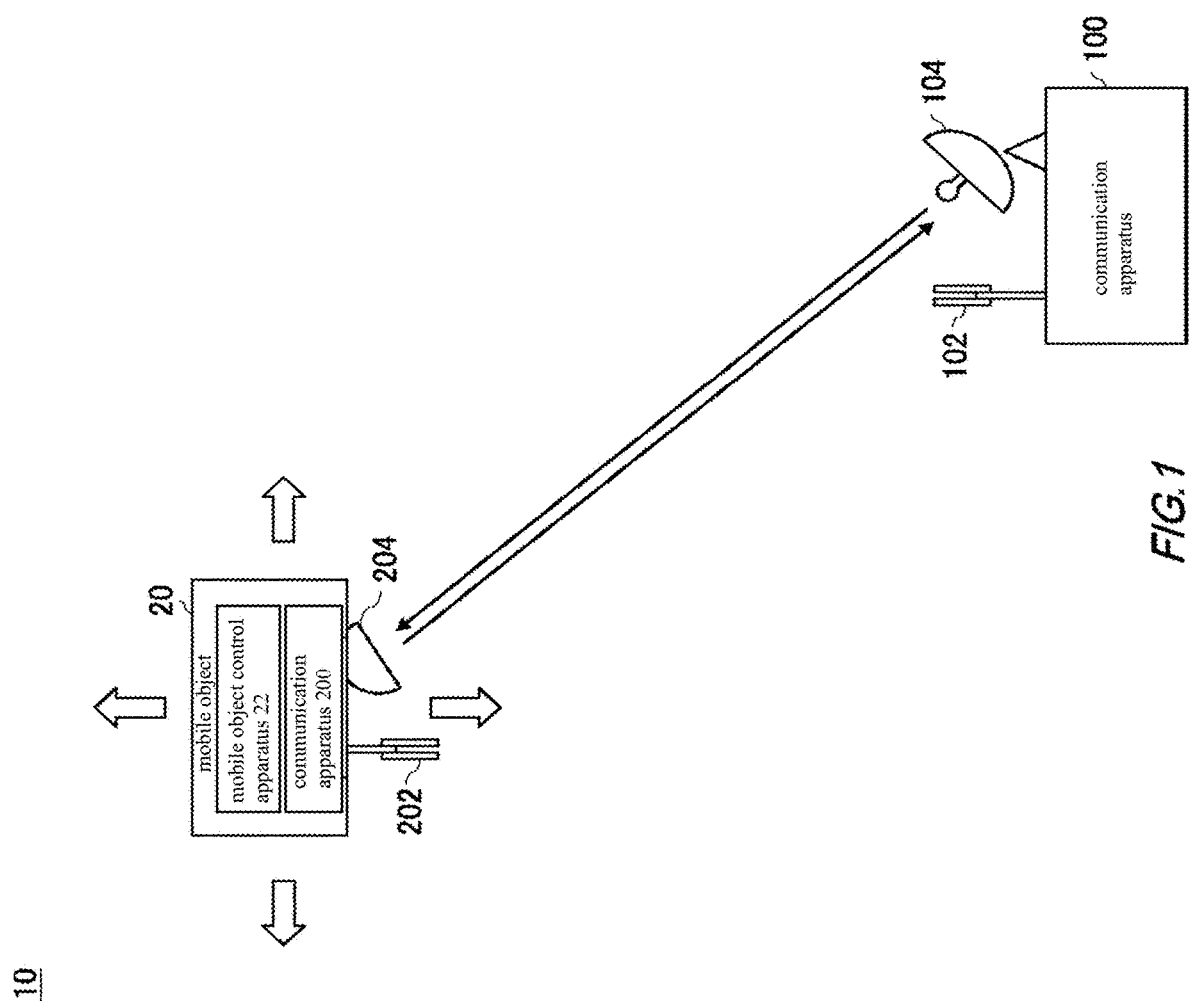
FIG. 1 schematically illustrates one example of a system 10.

FIG. 1 schematically illustrates one example of a system 10. The system 10 includes a communication apparatus 100 and a communication apparatus 200, at least one of which is loaded on a mobile object. In the example shown in FIG. 1, the communication apparatus 100 is installed fixedly, and the communication apparatus 200 is loaded on the mobile object 20.

The mobile object 20 may be any object as long as it is autonomously moveable. Examples of the mobile object 20 include an automobile, a ship, a drone, and a flight vehicle such as HAPS (High Altitude Platform Station) and so on.

The communication apparatus 100 includes a control antenna 102 and a directional antenna 104. The control antenna 102 may be an antenna with the directionality lower than that of the directional antenna 104. The control antenna 102 is, for example, an omni-antenna.

The communication apparatus 200 includes a control antenna 202 and a directional antenna 204. The control antenna 202 may be an antenna with a lower directionality than that of the directional antenna 204. The control antenna 202 is, for example, an omni-antenna.

The communication apparatus 100 and the communication apparatus 200 perform a wireless communication by the directional antenna 104 and the directional antenna 204. Since the location and posture of the communication apparatus 200 change due to the movement of the mobile object 20, the communication apparatus 100 is required to perform a calibration so that the directional antenna 104 directs correctly to the direction of the communication apparatus 200. On the other hand, the communication apparatus 200 is also required to perform a calibration so that the directional antenna 204 directs correctly to the direction of the communication apparatus 100. However, if the calibrations of both devices are performed, the receipt levels of the both devices change, and calibration failure happens, for example, the time required for the calibration becomes longer, the calibration is no longer possible or the like.

In contrast, the communication apparatus 100 and the communication apparatus 200 of the present embodiment take turns performing the calibration by having the other perform the calibration in response to the other receiving notification information indicating that the calibration of one has been completed.

For example, firstly, the communication apparatus 200 transmits, to the communication apparatus 100, the mobile object information including the location information of the mobile object 20 by the wireless communication between the control antenna 202 and the control antenna 102. The location information of the mobile object 20 may include latitude, longitude, and altitude of the mobile object 20. The mobile object information may further include the moving direction of the mobile object 20. The mobile object information may further include the movement velocity of the mobile object 20.

The mobile object information of the mobile object 20 may be provided to the communication apparatus 200 by the mobile object control apparatus 22 that controls the movement of the mobile object 20. The communication apparatus 200 may transmit the mobile object information acquired from the mobile object control apparatus 22 to the communication apparatus 100. The mobile object control apparatus 22 may include various types of sensors such as a location measuring sensor like a GPS sensor, a gyro sensor and an acceleration sensor, and may manage the location, moving direction and movement velocity of the mobile object 20.

The communication apparatus 200 may prestore the location information of the communication apparatus 100, and controls the direction of the directional antenna 204 to direct to the communication apparatus 100 based on the location and posture of the mobile object 20. The communication apparatus 100 estimates, with the mobile object information received from the communication apparatus 200, the direction, with reference to the location of the communication apparatus 100, in which the communication apparatus 200 is located, and controls the direction of the directional antenna 104 to direct to the communication apparatus 200.

Then, for example, the communication apparatus 100 performs the calibration of the directional antenna 104, by measuring the radio wave receipt intensity from the directional antenna 204 by the directional antenna 104 while continuously changing the direction of the directional antenna 104. The communication apparatus 100 may specify the direction of the directional antenna 104 to which the radio wave receipt intensity from the directional antenna 204 is the strongest, and complete the calibration by making the direction direct to the directional antenna 104. The communication apparatus 100 transmits the notification information to the communication apparatus 200 in response to the completion of the calibration of the directional antenna 104. The notification information may indicate the completion of the calibration.

The communication apparatus 200 performs the calibration of the directional antenna 204, by measuring the radio wave receipt intensity from the directional antenna 104 by the directional antenna 204 while continuously changing the direction of the directional antenna 204 in response to the receipt of the notification information. The communication apparatus 200 may specify the direction of the directional antenna 204 to which the radio wave receipt intensity from the directional antenna 104 is the strongest, and complete the calibration by making the direction direct to the directional antenna 204. The communication apparatus 100 transmits the notification information to the communication apparatus 200 in response to the completion of the calibration of the directional antenna 204. The notification information may indicate the completion of the calibration.

In this way, the calibration can be performed alternately by notifying to each other that the calibration has been completed and controlling not to perform the calibration until calibration of the other device is completed. In this way, resonance caused by starting the calibration simultaneously can be prevented.

In FIG. 1, the example of the case where the communication apparatus 100 is fixedly installed is described, but the communication apparatus 100 may also be loaded on the mobile object. In this case, the communication apparatus 100 may transmit the mobile object information including the location information of the mobile object to the communication apparatus 200 by the wireless communication between the control antenna 102 and the control antenna 202.

Figure 2:
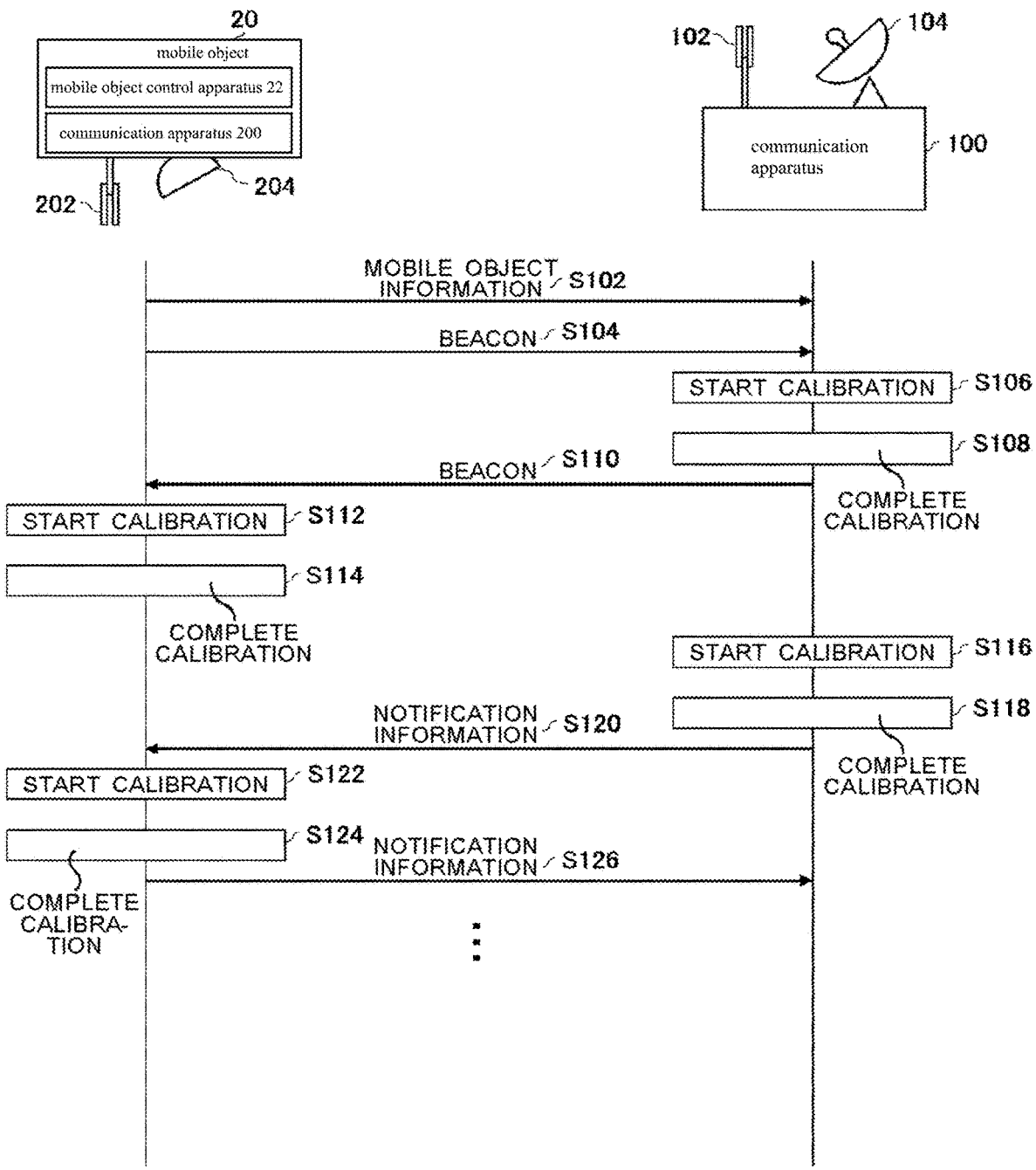
FIG. 2 schematically illustrates one example of a flow of a process of the system 10.

FIG. 2 schematically illustrates one example of a flow of a process of the system 10. Herein, the flow of the process where the communication apparatus 100 and the communication apparatus 200 alternately perform the calibration is shown.

In step (which may be abbreviated to S) 102, the communication apparatus 200 transmits the mobile object information of the mobile object 20 to the communication apparatus 100 by the wireless communication between the control antenna 202 and the control antenna 102. In S104, the communication apparatus 200 transmits the beacon signal by the directional antenna 204.

In S106, the communication apparatus 100 starts the calibration of the directional antenna 104. The communication apparatus 100 searches for a direction in which the radio wave receipt intensity is the strongest, by measuring the radio wave receipt intensity from the directional antenna 204 by the directional antenna 104 while continuously changing the direction of the directional antenna 104. The communication apparatus 100 specifies the direction of the directional antenna 104 in which the radio wave receipt intensity from the directional antenna 204 by the directional antenna 104 is the strongest, and completes the calibration by making the direction to direct to the directional antenna 104 (S108).

In S110, the communication apparatus 100 transmits the beacon signal by the directional antenna 104. In S112, the communication apparatus 200 starts the calibration of the directional antenna 204. The communication apparatus 200 searches for a direction in which the radio wave receipt intensity is the strongest, by measuring the radio wave receipt intensity from the directional antenna 104 by the directional antenna 204 while continuously changing the direction of the directional antenna 204. The communication apparatus 200 specifies the direction of the directional antenna 204 in which the radio wave receipt intensity from the directional antenna 104 by the directional antenna 204 is the strongest, and completes the calibration by making the direction to direct to the directional antenna 204 (S114). With these steps, the first calibration is completed.

In S116, the communication apparatus 100 starts the calibration of the directional antenna 104. The communication apparatus 100 may perform the calibration of the directional antenna 104 by measuring the radio wave receipt intensity from the directional antenna 204 by the directional antenna 104 when the data communication between the communication apparatus 100 and the communication apparatus 200 using the directional antenna 104 and the directional antenna 204 is performed. It should be noted that the communication apparatus 200 may transmit the beacon signal as appropriate by the directional antenna 204, and the communication apparatus 100 may perform the calibration of the directional antenna 104 by measuring the radio wave receipt intensity of the beacon signal by the directional antenna 104. The communication apparatus 100 transmits, according to the completion of the calibration (S118), the notification information to the communication apparatus 200 by the wireless communication between the control antenna 102 and the control antenna 202 (S120).

The communication apparatus 200 starts the calibration of the directional antenna 204 according to the receipt of the notification information (S122). The communication apparatus 200 may perform the calibration of the directional antenna 204 by measuring the radio wave receipt intensity from the directional antenna 104 by the directional antenna 204 when the data communication between the communication apparatus 200 and the communication apparatus 100 using the directional antenna 204 and the directional antenna 104 is performed. It should be noted that the communication apparatus 100 may transmit the beacon signal as appropriate by the directional antenna 104, and the communication apparatus 200 may perform the calibration of the directional antenna 204 by measuring the radio wave receipt intensity of the beacon signal by the directional antenna 204.

The communication apparatus 200 transmits, according to the completion of the calibration (S124), the notification information to the communication apparatus 100 by the wireless communication between the control antenna 202 and the control antenna 102 (S126). By repeating the processes from S116 to S126, the calibration may be performed continuously between the communication apparatus 100 and the communication apparatus 200 alternately.

Figure 3:
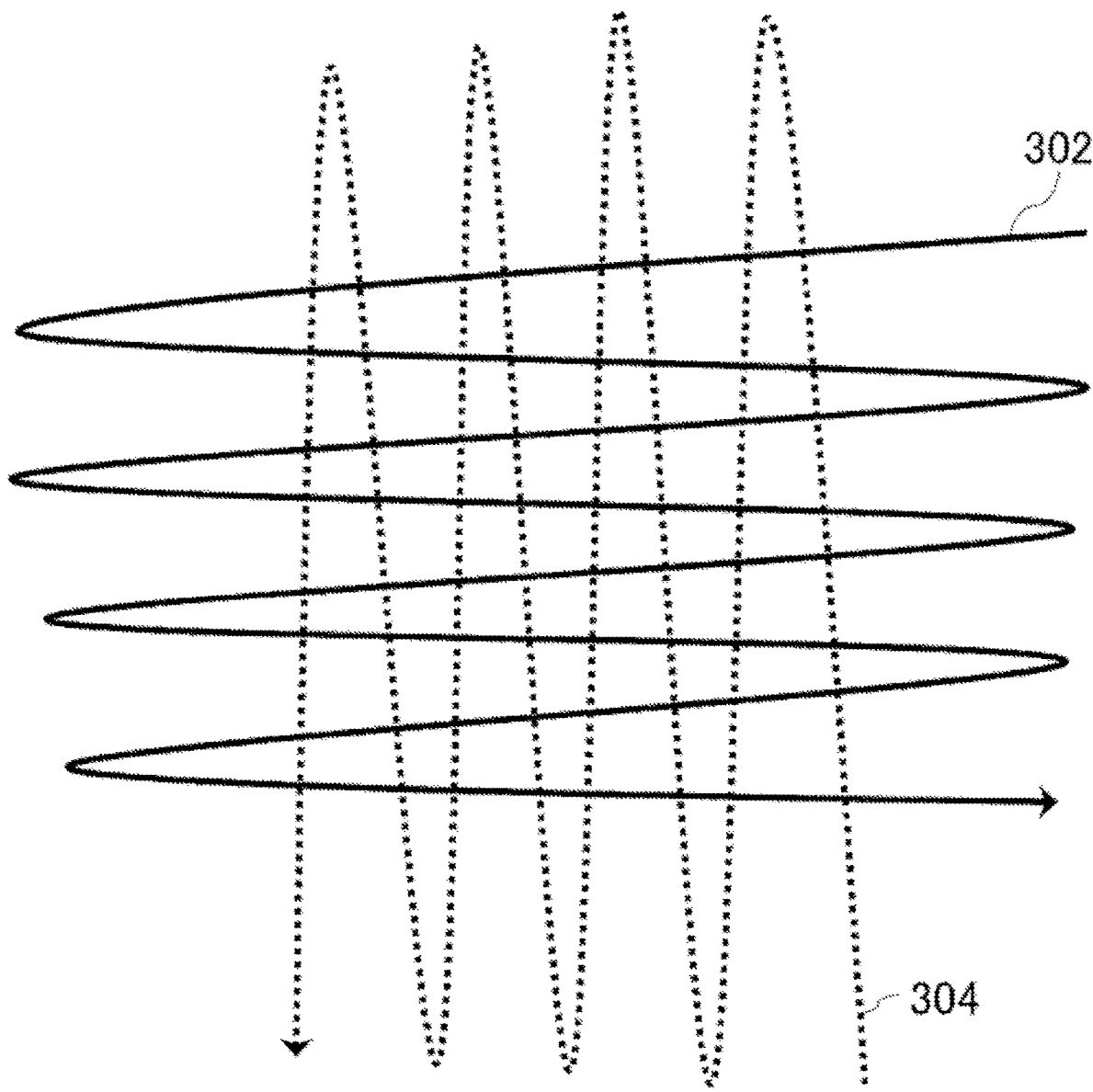
FIG. 3 schematically illustrates one example of a calibration orbit 300.
Figure 4:
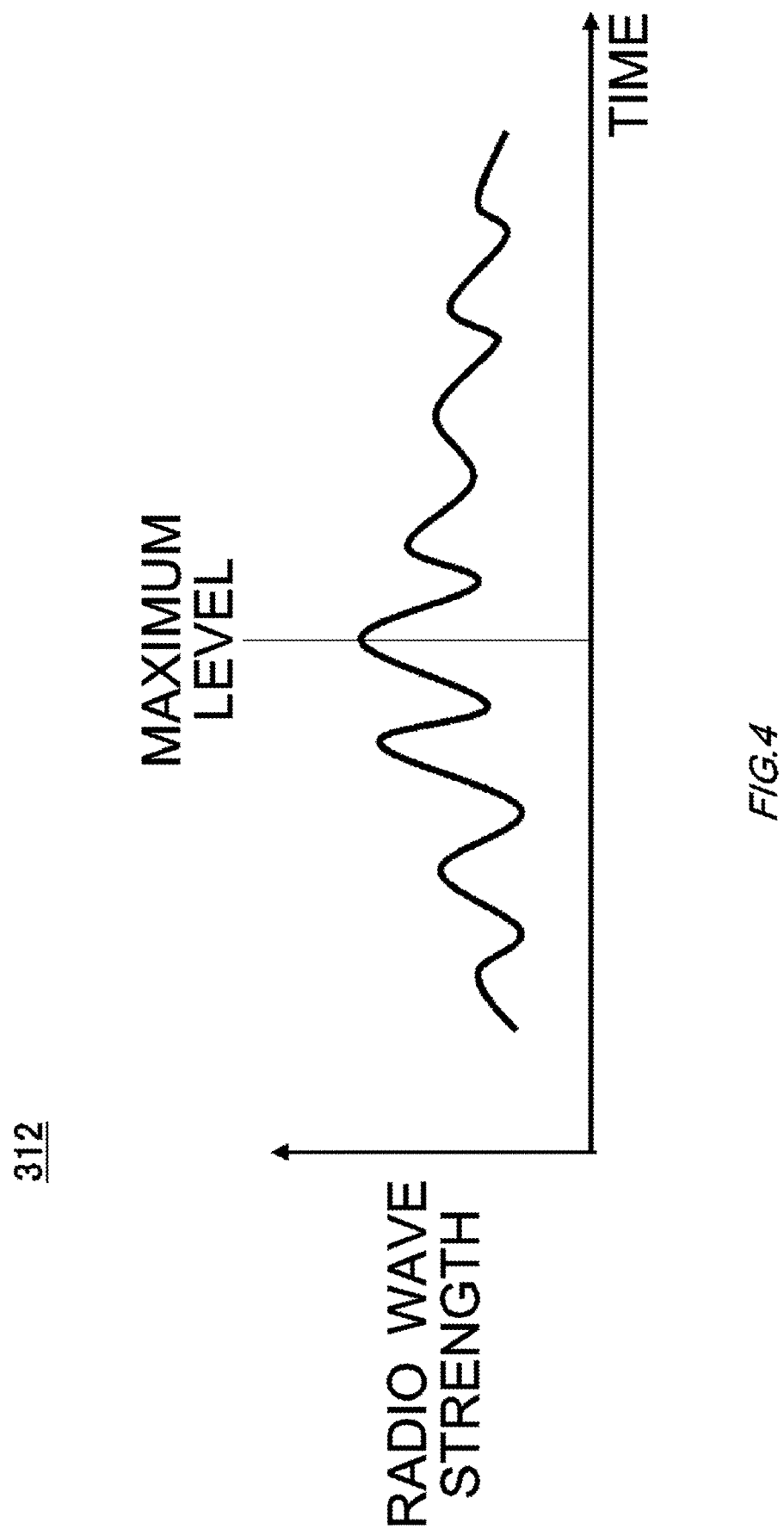
FIG. 4 schematically illustrates one example of a radio wave strength graph 312.
Figure 5:
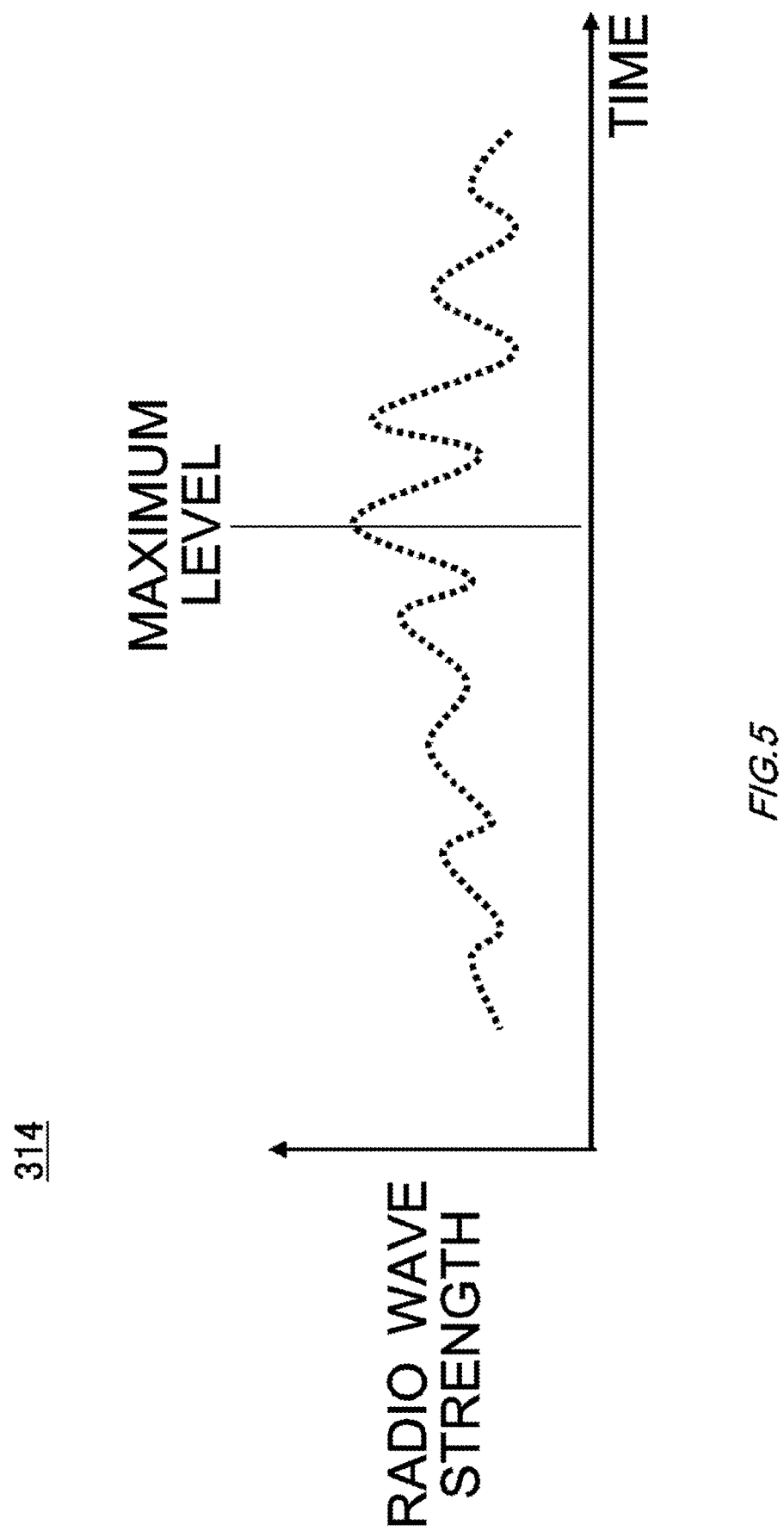
FIG. 5 schematically illustrates one example of a radio wave strength graph 314.

FIG. 3 schematically illustrates one example of the calibration orbit 300. FIG. 4 schematically illustrates one example of the radio wave strength graph 312. FIG. 5 schematically illustrates one example of the radio wave strength graph 314.

The calibration orbit 300 shown in FIG. 3 includes a lateral orbit 302 and a longitudinal orbit 304. The communication apparatus 100, for example, changes the direction of the directional antenna 104 along the lateral orbit 302 firstly, and next, changes the direction of the directional antenna 104 along the longitudinal orbit 304.

The radio wave strength graph 312 indicates the change of the radio wave receipt intensity from the directional antenna 204 by the directional antenna 104 when the direction of the directional antenna 104 is changed along the lateral orbit 302 by the communication apparatus 100. The radio wave strength graph 314 indicates the change of the radio wave receipt intensity from the directional antenna 204 by the directional antenna 104 when the direction of the directional antenna 104 is changed along the longitudinal orbit 304 by the communication apparatus 100.

Figure 6:
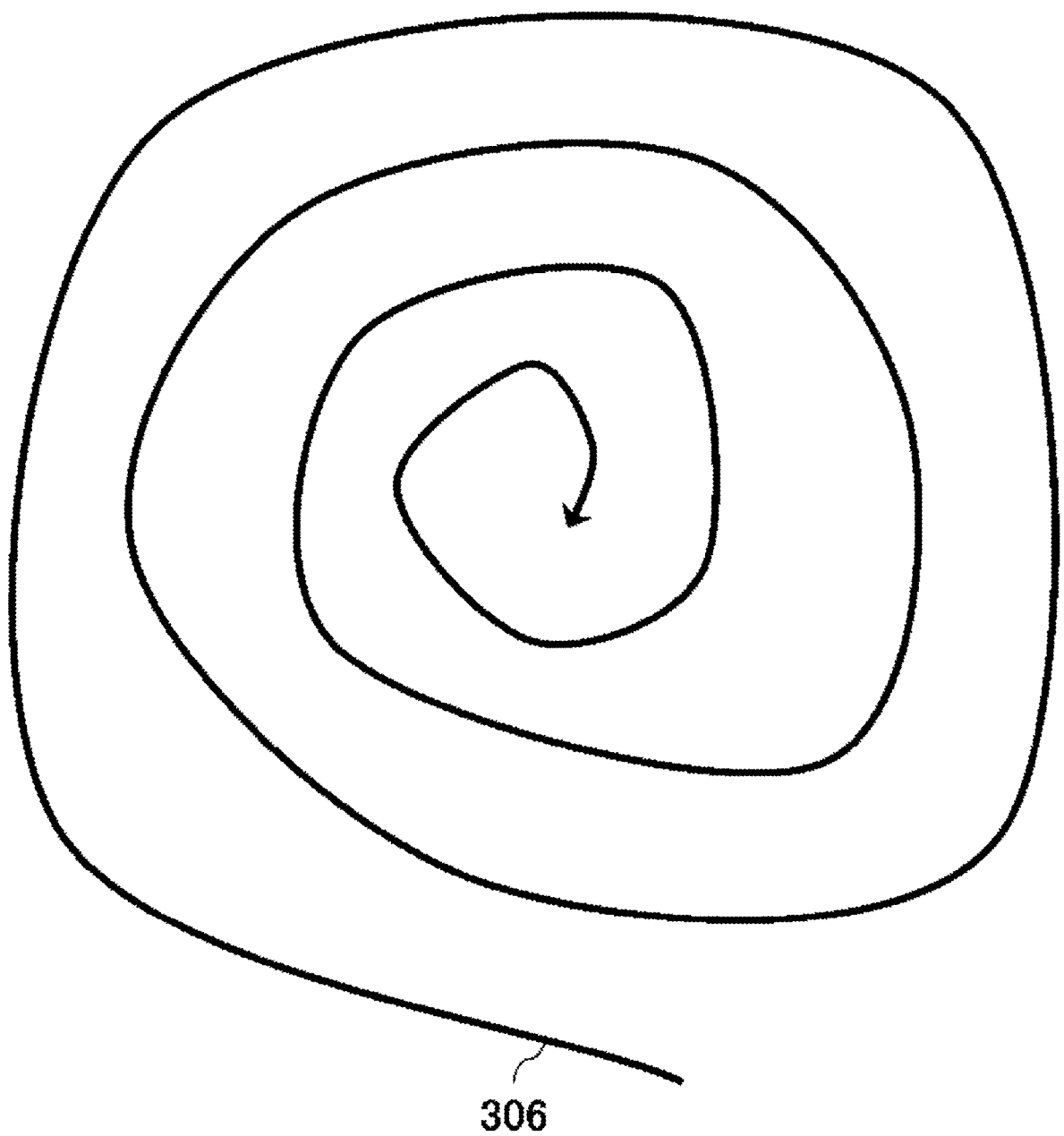
FIG. 6 schematically illustrates one example of the calibration orbit 300.
Figure 7:
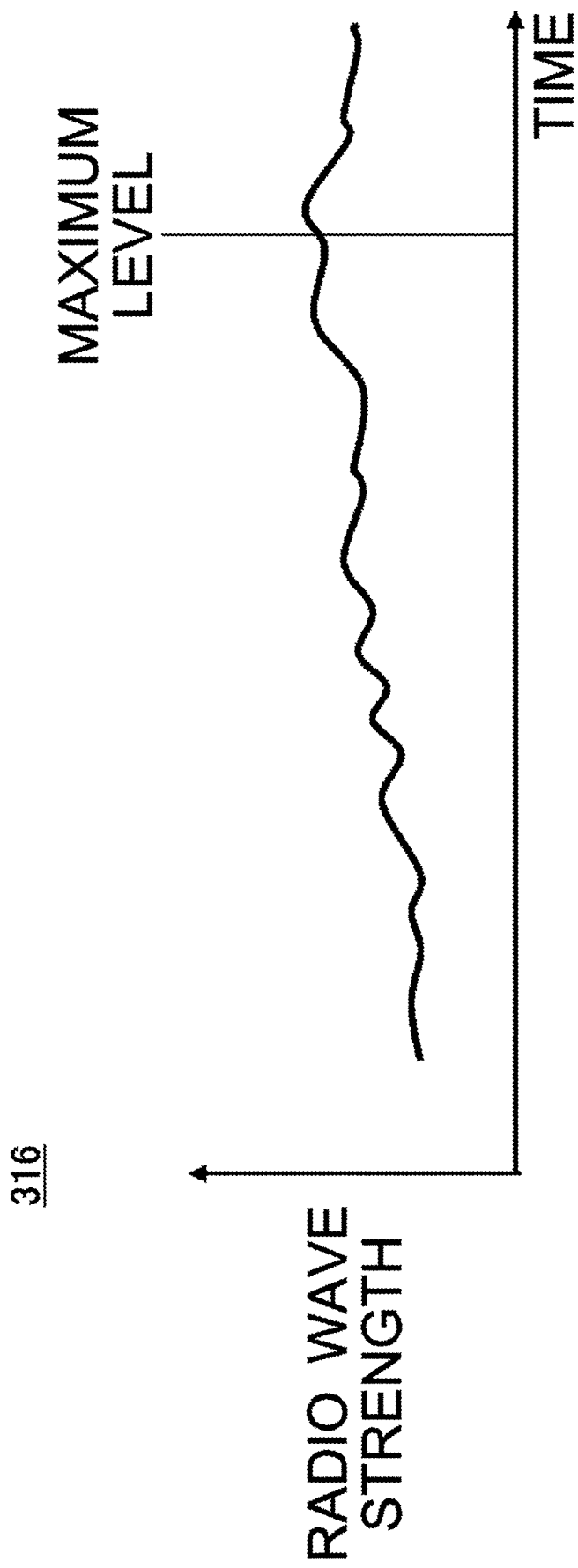
FIG. 7 schematically illustrates one example of a radio wave strength graph 316.

FIG. 6 schematically illustrates another example of the calibration orbit 300. FIG. 7 schematically illustrates one example of the radio wave strength graph 316.

The calibration orbit 300 shown in FIG. 6 includes a gyratory orbit 306. The communication apparatus 100 changes the direction of the directional antenna 104 along the gyratory orbit 306. The radio wave strength graph 316 indicates the change of the radio wave receipt intensity from the directional antenna 204 by the directional antenna 104 when the direction of the directional antenna 104 is changed along the gyratory orbit 306 by the communication apparatus 100.

Figure 8:
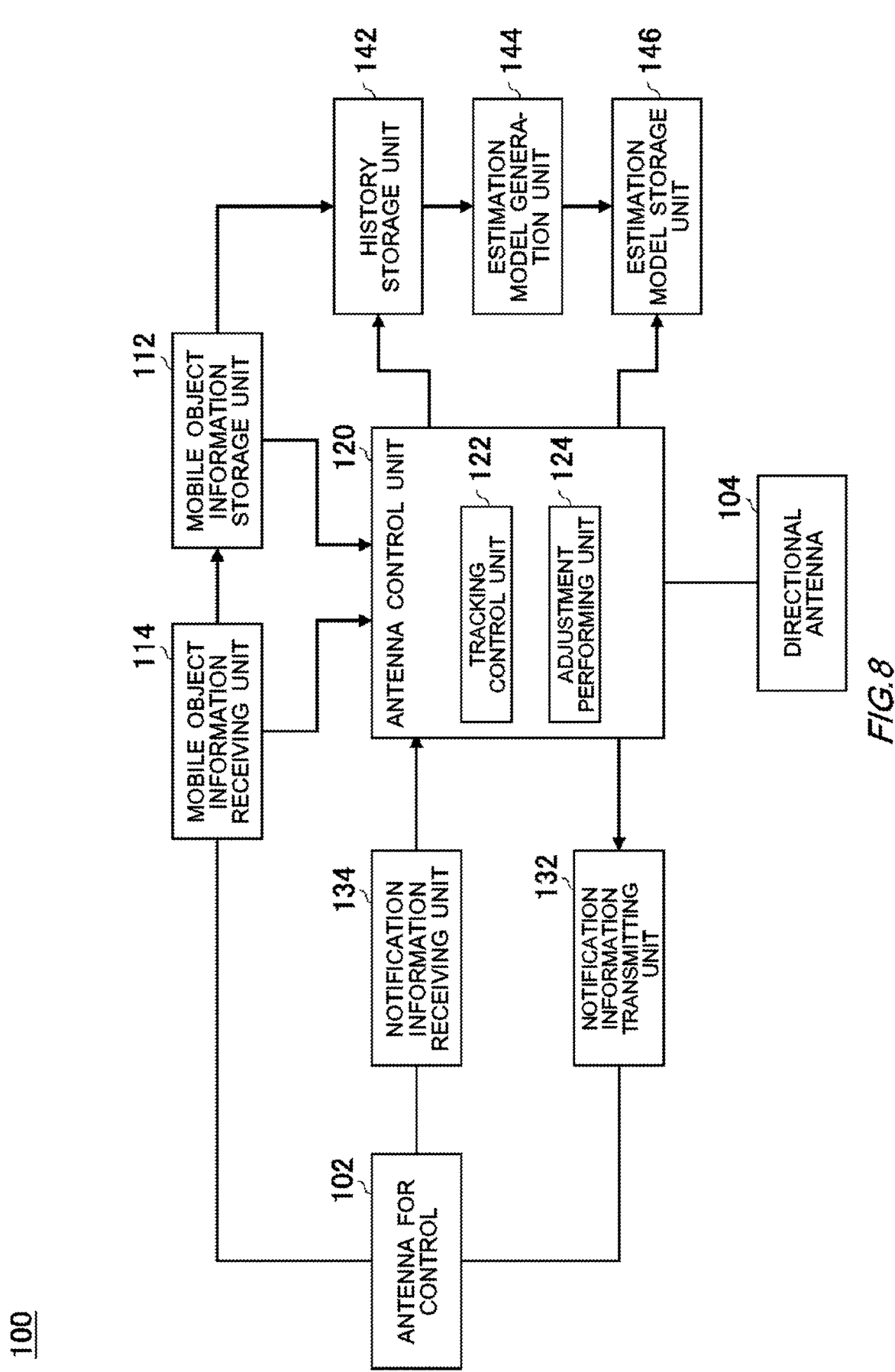
FIG. 8 schematically illustrates one example of a functional configuration of a communication apparatus 100.

FIG. 8 schematically illustrates one example of a functional configuration of the communication apparatus 100. The communication apparatus 100 includes a mobile object information storage unit 112, a mobile object information receiving unit 114, an antenna control unit 120, a notification information transmitting unit 132, a notification information receiving unit 134, a history storage unit 142, an estimation model generation unit 144 and an estimation model storage unit 146.

The mobile object information storage unit 112 stores mobile object-related information that relates to the mobile object 20 of the communication object. For example, when the mobile object 20 moves along a predetermined movement path or travels in circles in a predetermined movement path, the mobile object information storage unit 112 stores the information indicating the movement path of the mobile object 20.

The mobile object information receiving unit 114 receives the mobile object information including the location information of the mobile object 20. The mobile object information receiving unit 114 may receive the mobile object information by the wireless communication between the control antenna 102 and the control antenna 202 from the communication apparatus 200 of the mobile object 20. The mobile object information may include a moving direction of the mobile object 20. The mobile object information may also include a movement velocity of the mobile object 20. The mobile object information receiving unit 114 stores the received mobile object information in the mobile object information storage unit 112.

The antenna control unit 120 controls the directional antenna 104. The antenna control unit 120 includes a tracking control unit 122 and an adjustment performing unit 124.

The tracking control unit 122 predicts the location of the mobile object 20 based on the mobile object information stored in the mobile object information storage unit 112 received by the mobile object information receiving unit 114, and adjusts the direction of the directional antenna 104 to track the mobile object 20 based on the predicted location. The tracking control unit 122 may adjust the physical pointing direction of the directional antenna 104. The tracking control unit 122 predicts, for example, the location of the destination of the mobile object 20 based on the location information, moving direction and movement velocity included in the mobile object information, and adjusts the direction of the directional antenna 104 to make the directional antenna 104 direct to the direction of the predicted location.

The adjustment performing unit 124 performs the calibration of the directional antenna 104. The adjustment performing unit 124 performs the calibration of the directional antenna 104 by measuring the radio wave receipt intensity from the directional antenna 204 by the directional antenna 104 while changing the direction of the directional antenna 104 continuously. The adjustment performing unit 124 may change the physical pointing direction of the directional antenna 104 continuously.

The adjustment performing unit 124, for example, searches for the direction in which the radio wave receipt intensity is the strongest, by measuring the radio wave receipt intensity from the directional antenna 204 by the directional antenna 104 while changing the direction of the directional antenna 104 continuously. The adjustment performing unit 124 may specify the direction of the directional antenna 104 in which the radio wave receipt intensity of the directional antenna 204 by the directional antenna 104 is the strongest, and complete the calibration by making the directional antenna 104 direct to the direction.

The notification information transmitting unit 132 transmits the notification information to the communication apparatus 200 according to the completion of the calibration of the directional antenna 104 by the adjustment performing unit 124. The notification information transmitting unit 132 may transmit the notification information to the communication apparatus 200 via the control antenna 102. The notification information transmitting unit 132 may transmit the notification information to the communication apparatus 200 by the wireless communication between the control antenna 102 and the control antenna 202.

The notification information receiving unit 134 receives the notification information transmitted according to the completion of the calibration of the directional antenna 204 by the communication apparatus 200. The notification information receiving unit 134 may receive the notification information via the control antenna 102. The notification information receiving unit 134 may receive the notification information transmitted by the wireless communication between the control antenna 202 and the control antenna 102 by the communication apparatus 200.

The adjustment performing unit 124 may perform the calibration of the directional antenna 104 according to the receipt of the notification information from the communication apparatus 200 by the notification information receiving unit 134, without performing the calibration of the directional antenna 104 during performing the calibration of the directional antenna 204 by the communication apparatus 200.

The history storage unit 142 stores the history of the mobile object information stored in the mobile object information storage unit 112 and the direction of the directional antenna 104 after adjustment by the adjustment performing unit 124 in a location indicated by the location information included in the mobile object information.

The estimation model generation unit 144 generates an estimation model that estimates the direction of the directional antenna 104 after adjustment from the mobile object information, by using, as teacher data, the mobile object information and the direction of the directional antenna 104 after adjustment included in a plurality of pieces of history stored in the history storage unit 142.

The estimation model storage unit 146 stores the estimation model generated by the estimation model generation unit 144. When the plurality of pieces of history stored in the history storage unit 142 are provided to other apparatuses and estimation models are generated by the other apparatuses, the estimation model storage unit 146 may acquire and store the estimation models generated by the other apparatuses from the other apparatuses.

The adjustment performing unit 124 may use the estimation model stored in the estimation model storage unit 146 to adjust the direction of the directional antenna 104. For example, the adjustment performing unit 124 adjusts the direction of the directional antenna 104 based on the direction of the directional antenna 104 after adjustment that is estimated by using the estimation model from the received mobile object information by the mobile object information receiving unit 114. The adjustment performing unit 124 adjusts, for example, the estimated direction of the directional antenna 104 to match the direction of the directional antenna 104 after adjustment.

Particularly, when the mobile object 20 travels in circles, in the location through which the mobile object 20 is to pass, the direction of the directional antenna 104 and the directional antenna 204 are likely to be compatible by adjusting the direction of the directional antenna 104 to be the same as the direction in which the mobile object 20 used to pass through the location. The adjustment performing unit 124 can save the time for searching for the direction in which the radio wave receipt intensity is the strongest with the calibration by performing the adjustment of the directional antenna 104 using the estimation model.

Figure 9:
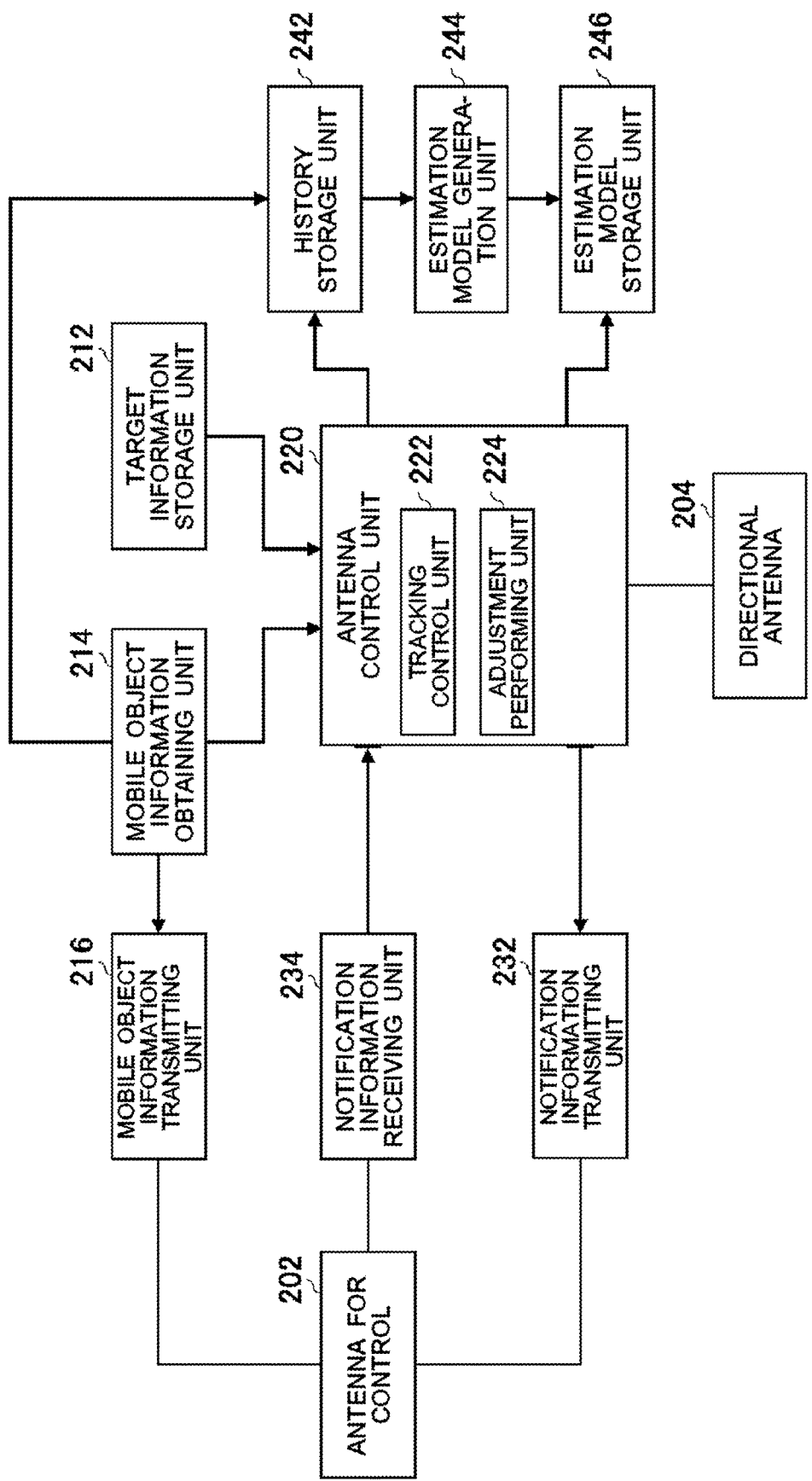
FIG. 9 schematically illustrates one example of a functional configuration of a communication apparatus 200.

FIG. 9 schematically illustrates one example of the functional configuration of the communication apparatus 200. The communication apparatus 200 includes a target information storage unit 212, a mobile object information acquisition unit 214, a mobile object information transmitting unit 216, an antenna control unit 220, a notification information transmitting unit 232, a notification information receiving unit 234, a history storage unit 242, an estimation model generation unit 244 and an estimation model storage unit 246.

The target information storage unit 212 stores the target information related to the communication object. The target information storage unit 212 stores, for example, the location information of the communication apparatus 100, which is the communication object.

The mobile object information acquisition unit 214 acquires the mobile object information of the mobile object 20 loaded with the communication apparatus 200. The mobile object information acquisition unit 214 may acquire the mobile object information from the mobile object control apparatus 22 of the mobile object 20.

The mobile object information transmitting unit 216 transmits the mobile object information acquired by the mobile object information acquisition unit 214 to the communication apparatus 100. The mobile object information transmitting unit 216 may transmit the mobile object information to the communication apparatus 100 by the wireless communication between the control antenna 202 and the control antenna 102.

The antenna control unit 220 controls the directional antenna 204. The antenna control unit 220 includes a tracking control unit 222 and an adjustment performing unit 224.

The tracking control unit 222 adjusts the direction of the directional antenna 204 to track the communication apparatus 100 based on the target object information stored in the target information storage unit 212 and the mobile object information acquired by the mobile object information acquisition unit 214. The tracking control unit 222 may specify the relative locational relationship with the communication apparatus 100 based on the target object information and the mobile object information, and the directional antenna 204 may adjust the direction of the directional antenna 204 to direct to the direction of the communication apparatus 100. The tracking control unit 222, for example, specifies the relative locational relationship between the directional antenna 204 and the communication apparatus 100 by predicting the posture and location of the mobile object 20 based on the location information, the moving direction and the movement velocity included in the mobile object information, and the directional antenna 204 adjusts the direction of the directional antenna 204 to direct to the direction of the communication apparatus 100.

The adjustment performing unit 224 performs the calibration of the directional antenna 204. The adjustment performing unit 224 performs the calibration of the directional antenna 204 by measuring the radio wave receipt intensity from the directional antenna 104 by the directional antenna 204 while changing continuously the direction of the directional antenna 204. The adjustment performing unit 224 may change continuously the physical pointing direction of the directional antenna 204.

The adjustment performing unit 224, for example, searches for the direction in which the radio wave receipt intensity is the strongest by measuring the radio wave receipt intensity from the directional antenna 104 by the directional antenna 204 while changing continuously the direction of the directional antenna 204. The adjustment performing unit 224 may specify the direction of the directional antenna 204 in which the radio wave receipt intensity from the directional antenna 104 by the directional antenna 204 is the strongest, and complete the calibration by making the directional antenna 204 direct to the direction.

The notification information transmitting unit 232 transmits the notification information to the communication apparatus 100 according to the completion of the calibration of the directional antenna 204 by the adjustment performing unit 224. The notification information transmitting unit 232 may transmit the notification information to the communication apparatus 100 via the control antenna 202. The notification information transmitting unit 232 may transmit the notification information to the communication apparatus 100 by the wireless communication between the control antenna 202 and the control antenna 102.

The notification information receiving unit 234 receives the notification information transmitted according to the completion of the calibration of the directional antenna 104 by the communication apparatus 100. The notification information receiving unit 234 may receive the notification information via the control antenna 202. The notification information receiving unit 234 may receive the notification information transmitted by the wireless communication between the control antenna 102 and the control antenna 202 by the communication apparatus 100.

The adjustment performing unit 224 may perform the calibration of the directional antenna 204 according to the receipt of the notification information from the communication apparatus 100 by the notification information receiving unit 234 without performing the calibration of the directional antenna 204 while performing the calibration of the directional antenna 104 by the communication apparatus 100.

The history storage unit 242 stores the history of the mobile object information acquired by the mobile object information acquisition unit 214 and the direction of the directional antenna 204 after adjustment that is adjusted by the calibration of the directional antenna 204 by the adjustment performing unit 224 in the location shown by the location information included in the mobile object information.

The estimation model generation unit 244 generates the estimation model that estimates the direction of the directional antenna 204 after adjustment from the mobile object information, using, as the teacher data, the mobile object information and the direction of the directional antenna 204 after adjustment included in the plurality of pieces of history stored in the history storage unit 242.

The estimation model storage unit 246 stores the estimation model generated by the estimation model generation unit 244. When the plurality of pieces of history stored in the history storage unit 242 are provided by the other apparatuses, and the estimation models are generated by the other apparatuses, the estimation model storage unit 246 may acquire the estimation models generated by the other apparatuses from the other apparatuses and store them.

The adjustment performing unit 224 may adjust the direction of the directional antenna 204 using the estimation model stored in the estimation model storage unit 246. For example, the adjustment performing unit 224 adjusts the direction of the directional antenna 204 based on the direction of the directional antenna 204 after adjustment, which is estimated using the estimation model, from the mobile object information acquired by the mobile object information acquisition unit 214. The adjustment performing unit 224 adjusts the direction of the directional antenna 204 to match the estimated direction of the directional antenna 204 after adjustment, for example.

Figure 10:
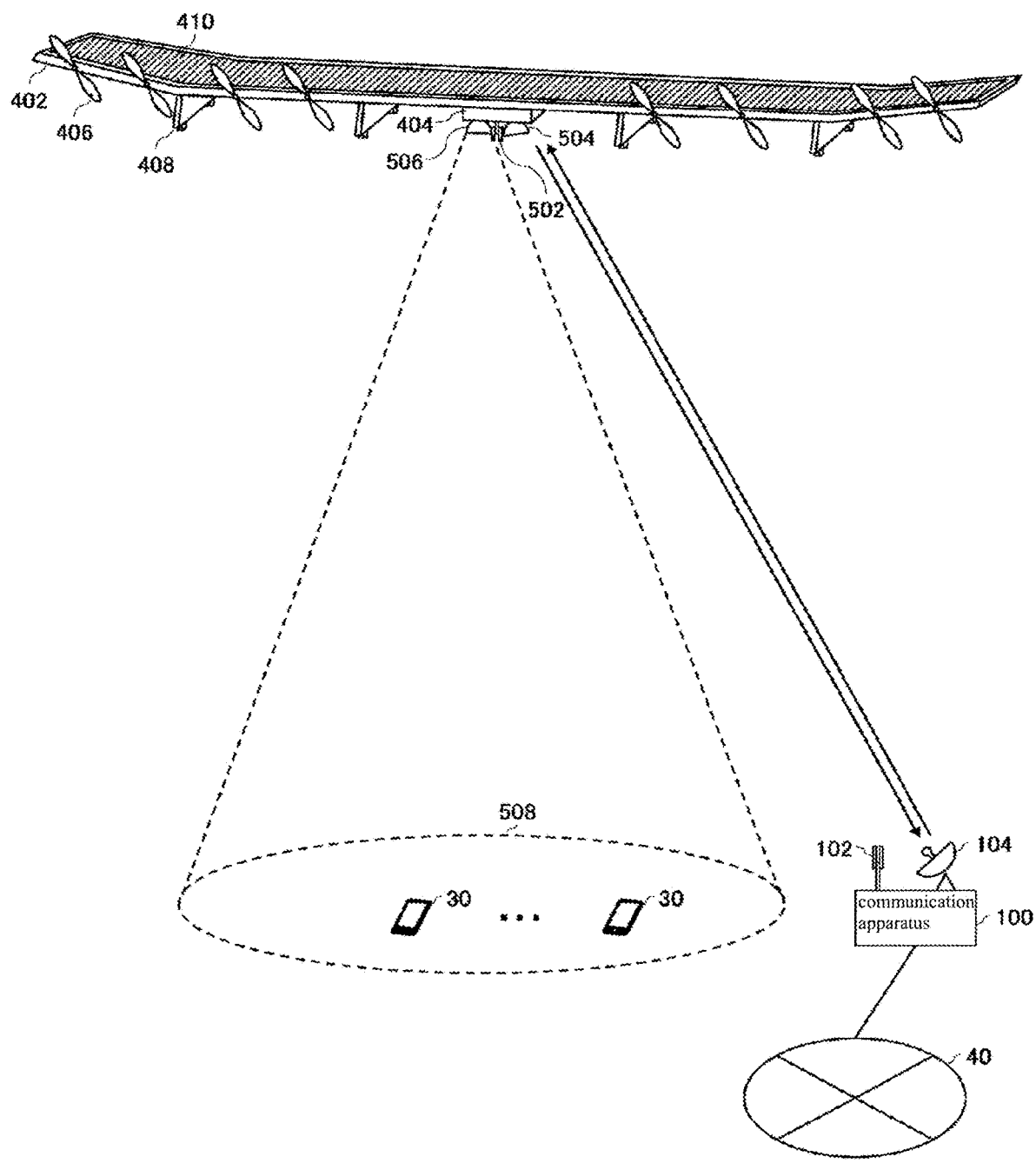
FIG. 10 schematically illustrates a HAPS 400 that is one example of the mobile object 20.

FIG. 10 schematically illustrates a HAPS 400 as one example of the mobile object 20. The HAPS 400 may be one example of a flight vehicle. The HAPS 400 includes a vehicle 402, a central unit 404, a propeller 406, a pod 408 and a solar panel 410. The central unit 404 includes a control apparatus 420 and a communication apparatus 500 that are not illustrated.

The electrical power generated by the solar panel 410 is stored in one or more batteries arranged in at least any of the vehicle 402, the central unit 404 and the pod 408. The electrical power stored in the battery is utilized by each component included in the HAPS 400.

The control apparatus 420 may control the flight of the HAPS 400. The control apparatus 420 controls the flight of the HAPS 400 by controlling the rotation of the propeller 406, for example. Also, the control apparatus 420 may control the flight of the HAPS 400 by changing the angle of a flap or an elevator that is not illustrated. The control apparatus 420 includes various types of sensors such as a location measuring sensor such as a GPS sensor, a gyro sensor and an acceleration sensor, and may manage the location, the moving direction and the movement velocity of the HAPS 400.

The communication apparatus 500 includes an control antenna 502, a FL (Feeder Link) antenna 504 and a SL (Service Link) antenna 506. The FL antenna 504 is an antenna for the feeder link. The FL antenna 504 may be one example of the directional antenna. The communication apparatus 500 forms the feeder link with the communication apparatus 100 on the ground by the FL antenna 504. The communication apparatus 500 and the communication apparatus 100 form the feeder link using the FL antenna 504 and the directional antenna 104.

The control antenna 502 is an antenna with a lower directionality than the FL antenna 504. The control antenna 502 may be an omni-antenna, for example. The control antenna 502 may be one example of the control antenna 202. The communication apparatus 500 and the communication apparatus 100 may form the C2 (Command Control) link by the control antenna 502 and the control antenna 102, and communicate by the C2 link.

The SL antenna 506 is an antenna for the service link. The SL antenna 506 may be an antenna with a lower directionality than the FL antenna 504, and a higher directionality than the control antenna 502. The communication apparatus 500 forms the cell 508 on the ground by the SL antenna 506. The communication apparatus 500 forms the service link with the user terminal 30 inside the cell 508 by the SL antenna 506.

The user terminal 30 may be any terminal as long as it is a communication terminal that can be communicate with the communication apparatus 500. For example, the user terminal 30 is a mobile phone such as a smartphone. The user terminal 30 may also be a tablet terminal, a PC (Personal Computer) and the like. The user terminal 30 may also be a so-called IoT (Internet of Thing) device. The user terminal 30 may include all things corresponding to so-called IoE (Internet of Everything).

The communication apparatus 500 may provide a wireless communication service to the user terminal 30 by relaying the communication between the user terminal 30 and the network 40 on the ground together with the communication apparatus 100. The network 40 may include a core network that is provided by a telecommunication carrier. The core network may comply with any mobile communication system, for example, it complies with the 3G (3rd Generation) communication system, the LTE (Long Term Evolution) communication system, the 4G (4th Generation) communication system, and the 5G (5th Generation) or later communication system, and the like. The network 40 may include the Internet.

The HAPS 400, for example, establishes the service link with each communication apparatus 100 arranged in each location on the ground and communicates with the network 40 on the ground via the communication apparatus 100. The HAPS 400 covers the ground area with the cell 508 while flying in circles along the circular flight path in the sky of the ground area of the targeted for coverage, for example. The flight path may be a regular circle, an ellipse and so on, or even a figure eight. The circling flight of the HAPS 400 in the sky of the ground area may be described as a fixed-point flight. Also, the HAPS 400, for example, covers the entire of the ground area by moving in the sky of the ground area while covering a part of the ground area of the targeted for coverage by the cell 508.

Figure 11:
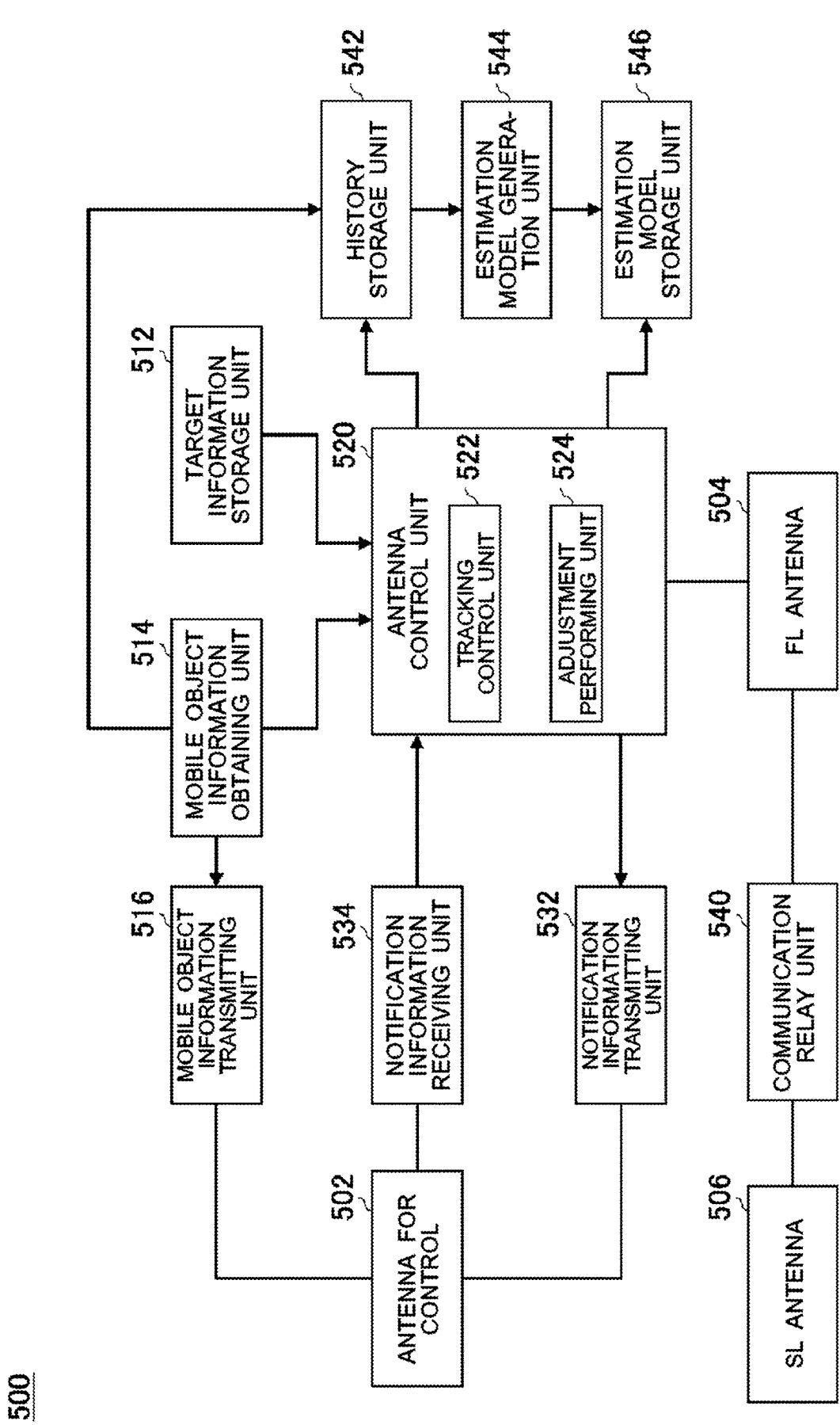
FIG. 11 schematically illustrates one example of a functional configuration of a communication apparatus 500.

FIG. 11 schematically illustrates one example of the functional configuration of the communication apparatus 500. The communication apparatus 500 includes a target information storage unit 512, a mobile object information acquisition unit 514, a mobile object information transmitting unit 516, an antenna control unit 520, a notification information transmitting unit 532, a notification information receiving unit 534, a communication relay unit 540, a history storage unit 542, an estimation model generation unit 544 and an estimation model storage unit 546.

The target information storage unit 512 stores target information related to the communication object. The target information storage unit 512 stores the location information of the communication apparatus 100 that is the communication object, for example.

The mobile object information acquisition unit 514 acquires the mobile object information of the HAPS 400 loaded with the communication apparatus 200. The mobile object information acquisition unit 514 may receive the mobile object information from the control apparatus 420 of the HAPS 400.

The mobile object information transmitting unit 516 transmits the mobile object information acquired by the mobile object information acquisition unit 514 to the communication apparatus 100. The mobile object information transmitting unit 516 may transmit the mobile object information to the communication apparatus 100 by the wireless communication between the control antenna 502 and the control antenna 102.

The antenna control unit 520 controls the FL antenna 504. The antenna control unit 520 includes a tracking control unit 522 and an adjustment performing unit 524.

The tracking control unit 522 adjusts the direction of the FL antenna 504 to track the communication apparatus 100 based on the target object information stored in the target information storage unit 512 and the mobile object information acquired by the mobile object information acquisition unit 514. The tracking control unit 522 may specify the relative locational relationship with the communication apparatus 100 based on the target object information and the mobile object information, and the FL antenna 504 may adjust the direction of the FL antenna 504 to direct to the direction of the communication apparatus 100. The tracking control unit 522, for example, specifies the relative locational relationship between the FL antenna 504 and the communication apparatus 100 by predicting the posture and the location of the HAPS 400 based on the location information, the moving direction and the movement velocity included in the mobile object information, and the FL antenna 504 adjusts the direction of the FL antenna 504 to direct to the direction of the communication apparatus 100.

The adjustment performing unit 524 performs the calibration of the FL antenna 504. The adjustment performing unit 524 performs the calibration of the FL antenna 504 by measuring the radio wave receipt intensity from the directional antenna 104 by the FL antenna 504 while changing continuously the direction of the FL antenna 504. The adjustment performing unit 524 may change continuously the physical pointing direction of the FL antenna 504.

The adjustment performing unit 524, for example, searches for the direction in which the radio wave receipt intensity is the strongest, by measuring the radio wave receipt intensity from the directional antenna 104 by the FL antenna 504 while changing continuously the direction of the FL antenna 504. The adjustment performing unit 524 may specify the direction of the FL antenna 504 in which the radio wave receipt intensity from the directional antenna 104 by the FL antenna 504 is the strongest and complete the calibration by making the FL antenna 504 to direct to the direction.

The notification information transmitting unit 532 transmits the notification information to the communication apparatus 100 according to the completion of the calibration of the FL antenna 504 by the adjustment performing unit 524. The notification information transmitting unit 532 may transmit the notification information to the communication apparatus 100 via the control antenna 502. The notification information transmitting unit 532 may transmit the notification information to the communication apparatus 100 by the wireless communication between the control antenna 502 and the control antenna 102.

The notification information receiving unit 534 receives the notification information transmitted according to the completion of the calibration of the directional antenna 104 by the communication apparatus 100. The notification information receiving unit 534 may receive the notification information via the control antenna 502. The notification information receiving unit 534 may receive the notification information transmitted by the wireless communication between the control antenna 102 and the control antenna 502 by the communication apparatus 100.

The adjustment performing unit 524 may perform the calibration of the FL antenna 504 according to the receipt of the notification information from the communication apparatus 100 by the notification information receiving unit 534, without performing the calibration of the FL antenna 504 during performing the calibration of the directional antenna 104 by the communication apparatus 100.

The communication relay unit 540 relays the communication between the user terminal 30 and the communication apparatus 100. The communication relay unit 540 may relay the communication between the user terminal 30 and the communication apparatus 100 by transmitting the data received from the user terminal 30 via the service link to the communication apparatus 100 via the feeder link. Herein, the adjustment performing unit 124 of the communication apparatus 100 may perform the calibration of the directional antenna 104 by measuring the radio wave receipt intensity by the directional antenna 104 of the wave modulation including the data transmitted by the communication apparatus 500. In this way, by making it possible to perform the calibration utilizing the wave modulation when relaying the data communication between the user terminal 30 and the communication apparatus 100, the need to interrupt data communication to transmit a beacon signal for calibration can be eliminated, and the calibration can be performed efficiently.

The history storage unit 542 stores the history of the mobile object information acquired by the mobile object information acquisition unit 514 and the direction of the FL antenna 504 after adjustment that is adjusted by the calibration of the FL antenna 504 by the adjustment performing unit 524 in the location shown by the location information included in the mobile object information.

The estimation model generation unit 544 generates an estimation model that estimates the direction of the FL antenna 504 after adjustment from the mobile object information, by using, as teacher data, the mobile object information and the direction of the FL antenna 504 after adjustment included in a plurality of pieces of history stored in the history storage unit 542.

The estimation model storage unit 546 stores the estimation model generated by the estimation model generation unit 544. When the plurality of pieces of history stored in the history storage unit 542 are provided by other apparatuses and estimation models are generated by the other apparatuses, the estimation model storage unit 546 may acquire and store the estimation models generated by the other apparatuses from the other apparatuses.

The adjustment performing unit 524 may use the estimation model stored in the estimation model storage unit 546 to adjust the direction of the FL antenna 504. For example, the adjustment performing unit 524 adjusts the direction of the FL antenna 504 based on the direction of the FL antenna 504 after adjustment, which is estimated using the estimation model, from the mobile object information acquired by the mobile object information acquisition unit 514. The adjustment performing unit 524, for example, adjusts the estimated direction of the FL antenna 504 to match the direction of the FL antenna 504 after adjustment.

Figure 12:
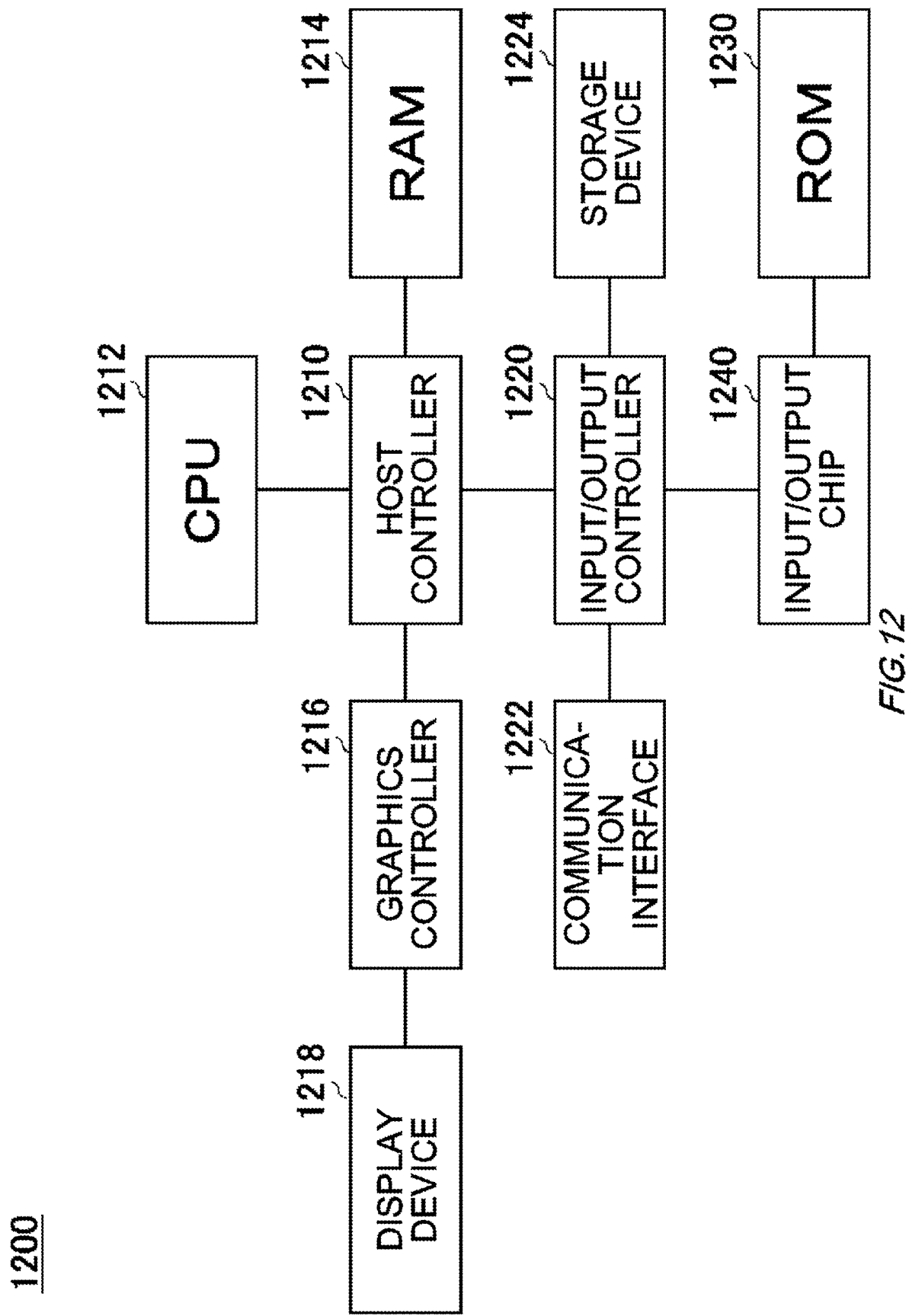
FIG. 12 schematically illustrates one example of a hardware configuration of a computer 1200 that functions as the communication apparatus 100, the communication apparatus 200 or the communication apparatus 500.

FIG. 12 schematically illustrates one example of a hardware configuration of a computer 1200 that functions as a communication apparatus 100, a communication apparatus 200 or a communication apparatus 500. A program that is installed in the computer 1200 can cause the computer 1200 to function as one or more sections of the apparatus of the present embodiment or cause the computer 1200 to execute operations associated with the apparatus of the present embodiment or the one or more sections, and/or cause the computer 1200 to execute the process of the present embodiment or steps thereof. Such programs may be executed by a central processing unit (CPU) 1212 in order to cause the computer 1200 to execute a specific operation associated with some or all of the flowchart and the blocks in the block diagrams described in the present specification.

The computer 1200 according to the present embodiment includes the CPU 1212, a RAM 1214, and a graphics controller 1216 which are mutually connected by a host controller 1210. The computer 1200 also includes a communication interface 1222, a storage device 1224, and an input and output unit such as an IC card drive which are connected to the host controller 1210 via an input and output controller 1220. The storage device 1224 may be a hard disk drive, a solid state drive, or the like. The computer 1200 also includes legacy input/output units such as a ROM 1230 and a keyboard, which are connected to the input/output controller 1220 via an input/output chip 1240.

The CPU 1212 operates according to the programs stored in the ROM 1230 and the RAM 1214, thereby controlling each unit. The graphics controller 1216 is configured to acquire image data generated by the CPU 1212 in a frame buffer or the like provided in the RAM 1214 or in itself, and cause the image data to be displayed on a display device 1218.

The communication interface 1222 communicates with other electronic devices via a network. The storage device 1224 stores programs and data used by the CPU 1212 in the computer 1200. The IC card drive reads programs and data from an IC card, and/or writes programs and data into the IC card.

The ROM 1230 stores therein boot programs or the like executed by the computer 1200 at the time of activation, and/or stores programs depending on hardware of the computer 1200. The input/output chip 1240 may also be configured to connect various input/output units to the input/output controller 1220 via a USB port, a parallel port, a serial port, a keyboard port, a mouse port or the like.

The programs are provided via a computer readable storage medium such as an IC card. The programs are read from a computer readable storage medium, installed in the storage device 1224, the RAM 1214, or the ROM 1230 which is also an example of the computer readable storage medium, and executed by the CPU 1212. Information processing written in these programs is read by the computer 1200, and provides cooperation between the programs and the various types of hardware resources described above. An apparatus or a method may be configured by realizing an operation or processing of information according to a use of the computer 1200.

For example, when communication is performed between the computer 1200 and an external device, the CPU 1212 may execute a communication program loaded in the RAM 1214, and instruct the communication interface 1222 to execute communication processing based on processing written in the communication program. The communication interface 1222, under the control of the CPU 1212, reads transmission data stored in a transmission buffer processing region provided in a recording medium such as the RAM 1214, the storage device 1224, or the IC card, transmits the read transmission data to the network, or writes receipt data received from the network into a receipt buffer processing region or the like provided on the recording medium.

In addition, the CPU 1212 may cause all or necessary portion of a file or a database stored in the external recording medium such as the storage device 1224 or the IC card, to be read by the RAM 1214, and execute various types of processing on the data on the RAM 1214. Next, the CPU 1212 may write back the processed data to the external recording medium.

Various types of programs and various types of information such as data, a table, and a database may be stored in the recording medium, and subjected to information processing. The CPU 1212 may execute, on the data read from the RAM 1214, various types of processing including various types of operations, information processing, conditional judgement, conditional branching, unconditional branching, information retrieval/replacement, or the like described in any part in the present disclosure and specified by instruction sequences of the programs, and writes back the results to the RAM 1214. In addition, the CPU 1212 may retrieve information in a file, a database, or the like in the recording medium. For example, when a plurality of entries each having an attribute value of a first attribute associated with an attribute value of a second attribute are stored in the recording medium, the CPU 1212 may retrieve, out of the plurality of entries, an entry with the attribute value of the first attribute specified that meets a condition, read the attribute value of the second attribute stored in the entry, and thereby acquire the attribute value of the second attribute associated with the first attribute meeting a predetermined condition.

The above-described program or software modules may be stored in the computer-readable storage medium on or near the computer 1200. In addition, a recording medium such as a hard disk or a RAM provided in a server system connected to a dedicated communication network or the Internet can be used as the computer readable storage medium, so that the programs are provided to the computer 1200 via the network.

In the present embodiment, blocks of the flowcharts and the block diagrams may represent steps of processes in which operations are executed or sections of apparatuses responsible for performing operations. A specific step and "unit" may be implemented by a dedicated circuit, a programmable circuit supplied along with a computer readable instruction stored on a computer readable storage medium, and/or a processor supplied along with the computer readable instruction stored on the computer readable storage medium. A dedicated circuit may include digital and/or analog hardware circuits and may include integrated circuits (IC) and/or discrete circuits. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer readable storage medium may include any tangible device capable of storing an instruction executed by an appropriate device, so that the computer readable storage medium having the instruction stored thereon constitutes a product including an instruction that may be executed in order to provide means to execute an operation specified by a flowchart or a block diagram. Examples of the computer-readable storage medium may include an electronic storage medium, a magnetic storage medium, an optical storage medium, a magneto-electric storage medium, a semiconductor storage medium, and the like. More specific examples of the computer readable storage medium may include a FLOPPY (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a BLU-RAY (registered trademark) disk, a memory stick, an integrated circuit card, or the like.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as SMALLTALK (registered trademark), JAVA (registered trademark), or C++, and conventional procedural programming languages, such as "C" programming languages or similar programming languages.

The computer readable instruction may be provided to a general purpose computer, a special purpose computer, or a processor or a programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus is to execute the computer readable instruction to provide means to execute operations specified by the flowchart or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: mobile object; 22: mobile object control apparatus; 30: user terminal; 40: network; 100: communication apparatus; 102: control antenna; 104: directional antenna; 112: mobile object information storage unit; 114: mobile object information receiving unit; 120: antenna control unit; 122: tracking control unit; 124: adjustment performing unit; 132: notification information transmitting unit; 134: notification information receiving unit; 142: history storage unit; 144: estimation model generation unit; 146: estimation model storage unit; 200: communication apparatus; 202: control antenna; 204: directional antenna; 212: target information storage unit; 214: mobile object information acquisition unit; 216: mobile object information transmitting unit; 220: antenna control unit; 222: tracking control unit; 224: adjustment performing unit; 232: notification information transmitting unit; 234: notification information receiving unit; 242: history storage unit; 244: estimation model generation unit; 246: estimation model storage unit; 302: lateral orbit; 304: longitudinal orbit; 312: radio wave strength graph; 314: radio wave strength graph; 306: gyratory orbit; 316: radio wave strength graph; 400: HAPS; 402: vehicle; 404: central unit; 406: propeller; 408: pod; 410: solar panel; 420: control apparatus; 500: communication apparatus; 502: control antenna; 504: FL antenna; 506: SL antenna; 508: cell; 512: target information storage unit; 514: mobile object information acquisition unit; 516: mobile object information transmitting unit; 520: antenna control unit; 522: tracking control unit; 524: adjustment performing unit; 532: notification information transmitting unit; 534: notification information receiving unit; 540: communication relay unit; 542: history storage unit; 544: estimation model generation unit; 546: estimation model storage unit; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip

What is claimed is:

1. A system, comprising:
    at least one processor;
    a first communication apparatus including a first directional antenna; and
    a second communication apparatus, loaded on a mobile object, including a second directional antenna,
    wherein the first communication apparatus includes:
        a first adjustment performing unit configured to use the at least one processor to perform a calibration of the first directional antenna, by measuring a radio wave receipt intensity from the second directional antenna by the first directional antenna while changing continuously a direction of the first directional antenna; and
        a first notification information transmitter configured to transmit a first notification information to the second communication apparatus according to a completion of a calibration of the first directional antenna by the first adjustment performing unit using the at least one processor; and
    wherein the second communication apparatus includes a second adjustment performing unit configured to use the at least one processor to perform a calibration of the second directional antenna by measuring a radio wave receipt intensity from the first directional antenna by the second directional antenna while changing continuously a direction of the second directional antenna according to a receipt of the first notification information.

2. The system according to claim 1, wherein the second adjustment performing unit is configured to use the at least one processor to perform a calibration of the second directional antenna according to a receipt of the first notification information without performing a calibration of the second directional antenna during performing a calibration of the first directional antenna by the first adjustment performing unit using the at least one processor.

3. The system according to claim 1,
    wherein the second communication apparatus includes a second notification information transmitter configured to transmit a second notification information to the first communication apparatus according to a completion of a calibration of the second directional antenna by the second adjustment performing unit using the at least one processor; and
    wherein the first adjustment performing unit is configured to use the at least one processor to perform a calibration of the first directional antenna according to a receipt of the second notification information without performing a calibration of the first directional antenna during performing a calibration of the second directional antenna by the second adjustment performing unit using the at least one processor.

4. The system according to claim 3, wherein
    the second communication apparatus includes a second control antenna configured to transmit mobile object information related to the mobile object, with a lower directionality than the second directional antenna;
    the first communication apparatus includes a first control antenna configured to communicate with the second control antenna, with a lower directionality than the first directional antenna;
    the first notification information transmitter is configured to transmit the first notification information to the second communication apparatus using the first control antenna; and
    the second notification information transmitter is configured to transmit the second notification information to the first communication apparatus using the second control antenna.

5. The system according to claim 4, wherein
    the mobile object is configured to travel in circles in a predetermined path;
    the second communication apparatus includes a mobile object information transmitter configured to transmit the mobile object information including location information, a moving direction and a movement velocity of the mobile object to the first communication apparatus using the second control antenna;
    the first communication apparatus includes:
    a history storage configured to store history of the mobile object information and of the direction of the first directional antenna after adjustment, which is adjusted by a calibration of the first directional antenna by the first adjustment performing unit using the at least one processor in a location shown in location information included in the mobile object information; and
    an estimation model storage configured to store an estimation model for estimating the direction of the first directional antenna after adjustment from the mobile object information, that is generated by using, as teacher data, the mobile object information and the direction of the first directional antenna after adjustment included in the history; and
    the first adjustment performing unit is configured to use the at least one processor to adjust the direction of the first directional antenna based on the direction of the first directional antenna after adjustment estimated from the mobile object information that has been received, using the estimation model.

6. The system according to claim 1, wherein
    the first communication apparatus is installed on the ground;
    the second communication apparatus is configured to form a service link with a user terminal on the ground, and is loaded on a flight vehicle configured to communicate with the user terminal via the service link; and
    the first communication apparatus and the second communication apparatus form a feeder link using the first directional antenna and the second directional antenna.

7. The system according to claim 6, wherein
    the second communication apparatus includes a second control antenna configured to transmit mobile object information related to the flight vehicle with a lower directionality than the second directional antenna;
    the first communication apparatus includes a first control antenna configured to communicate with the second control antenna with a lower directionality than the first directional antenna; and
    the first notification information transmitter is configured to transmit the first notification information to the second communication apparatus using the first control antenna.

8. The system according to claim 7, wherein the first communication apparatus and the second communication apparatus are configured to form a C2 link by the first control antenna and the second control antenna, and communicate by the C2 link.

9. The system according to claim 7, wherein
    the second communication apparatus includes a mobile object information transmitter configured to transmit the mobile object information including location information, a moving direction and a movement velocity of the flight vehicle using the second control antenna to the first communication apparatus; and the first communication apparatus includes a tracking control unit configured to use the at least one processor to predict a location of the flight vehicle based on the mobile object information and adjust the direction of the first directional antenna to track the flight vehicle based on a predicted location.

10. The system according to claim 9, wherein the first adjustment performing unit is configured to use the at least one processor to perform a calibration of the first directional antenna, after completing an adjustment of the direction of the first directional antenna by the tracking control unit.

11. The system according to claim 7, wherein
the second communication apparatus includes a communication relay configured to transmit data received from the user terminal via the service link to the first communication apparatus via the feeder link; and
the first adjustment performing unit is configured to use the at least one processor to perform a calibration of the first directional antenna by measuring a radio wave receipt intensity by the first directional antenna of a wave modulation including data transmitted by the second communication apparatus.

12. A communication apparatus, comprising:
a first directional antenna;
an adjustment performing unit configured to use the at least one processor to perform a calibration of the first directional antenna by measuring a radio wave receipt intensity from a second directional antenna included in a mobile object by the first directional antenna while changing continuously a direction of the first directional antenna; and
a notification information transmitter configured to transmit first notification information to the mobile object according to a completion of a calibration of the first directional antenna by the adjustment performing unit.

13. The communication apparatus according to claim 12, comprising
a notification information receiver configured to receive, from the mobile object, second notification information transmitted according to a completion of a calibration of the second directional antenna by measuring a radio wave receipt intensity from the first directional antenna by the second directional antenna while changing continuously the direction of the second directional antenna,
wherein the adjustment performing unit is configured to use the at least one processor to perform a calibration of the first directional antenna according to a receipt of the second notification information by the notification information receiving unit receiver.

14. The communication apparatus according to claim 13, wherein the adjustment performing unit is configured to use the at least one processor to perform a calibration of the first directional antenna according to a receipt of the second notification information without performing a calibration of the first directional antenna during performing a calibration of the second directional antenna by the mobile object.

15. The communication apparatus according to claim 12, wherein
the mobile object is a flight vehicle configured to form a service link with a user terminal on the ground, and communicate with the user terminal via the service link; and the communication apparatus and the mobile object are configured to form a feeder link using the first directional antenna and the second directional antenna.

16. A non-transitory computer-readable storage medium having a program stored therein, when executed by a computer including at least one processor, causing the computer to function as:
an adjustment performing unit configured to use the at least one processor to perform a calibration of a first directional antenna by measuring a radio wave receipt intensity from a second directional antenna included in a mobile object by the first directional antenna while changing continuously a direction of the first directional antenna; and
a notification information transmitter configured to transmit first notification information to the mobile object according to a completion of a calibration of the first directional antenna by the adjustment performing unit.

17. A control method performed by a communication apparatus including a first directional antenna, comprising:
performing adjustment in which a calibration of a first directional antenna is performed by measuring a radio wave receipt intensity from a second directional antenna included in a mobile object by the first directional antenna while changing continuously a direction of the first directional antenna; and
transmitting notification information in which first notification information is transmitted to the mobile object according to a completion of a calibration of the first directional antenna.

18. A communication apparatus loaded on a mobile object, comprising:
at least one processor;
a first directional antenna;
an adjustment performing unit configured to use the at least one processor to perform a calibration of the first directional antenna by measuring a radio wave receipt intensity from a second directional antenna included in an additional communication apparatus by the first directional antenna while changing continuously a direction of the first directional antenna; and
a notification information transmitter configured to transmit first notification information to the additional communication apparatus according to a completion of a calibration of the first directional antenna by the adjustment performing unit.

19. A non-transitory computer-readable storage medium having a program stored therein, when executed by a computer having at least one processor loaded on a mobile object, causing the computer to function as:
an adjustment performing unit configured to use the at least one processor to perform a calibration of a first directional antenna of the mobile object by measuring a radio wave receipt intensity from a second directional antenna included in an additional communication apparatus by the first directional antenna while changing continuously a direction of the first directional antenna; and
a notification information transmitter configured to transmit first notification information to the additional communication apparatus according to a completion of a calibration of the first directional antenna by the adjustment performing unit.

20. A control method performed by a communication apparatus, loaded on a mobile object, including a first directional antenna, comprising:

performing adjustment, in which a calibration of a first directional antenna is performed by measuring a radio wave receipt intensity from a second directional antenna included in an additional communication apparatus by the first directional antenna while changing continuously a direction of the first directional antenna; and transmitting notification information, in which a first notification information is transmitted to the additional communication apparatus according to a completion of a calibration of the first directional antenna.

* * * * *